Sept. 1, 1953             I. S. BOYDSTUN             2,650,739
VOLUMETRIC MEASURING AND DISPENSING DEVICE
WITH CONTAINER CUTTING AND ATTACHING MEANS
Filed Oct. 30, 1950                                       2 Sheets-Sheet 1
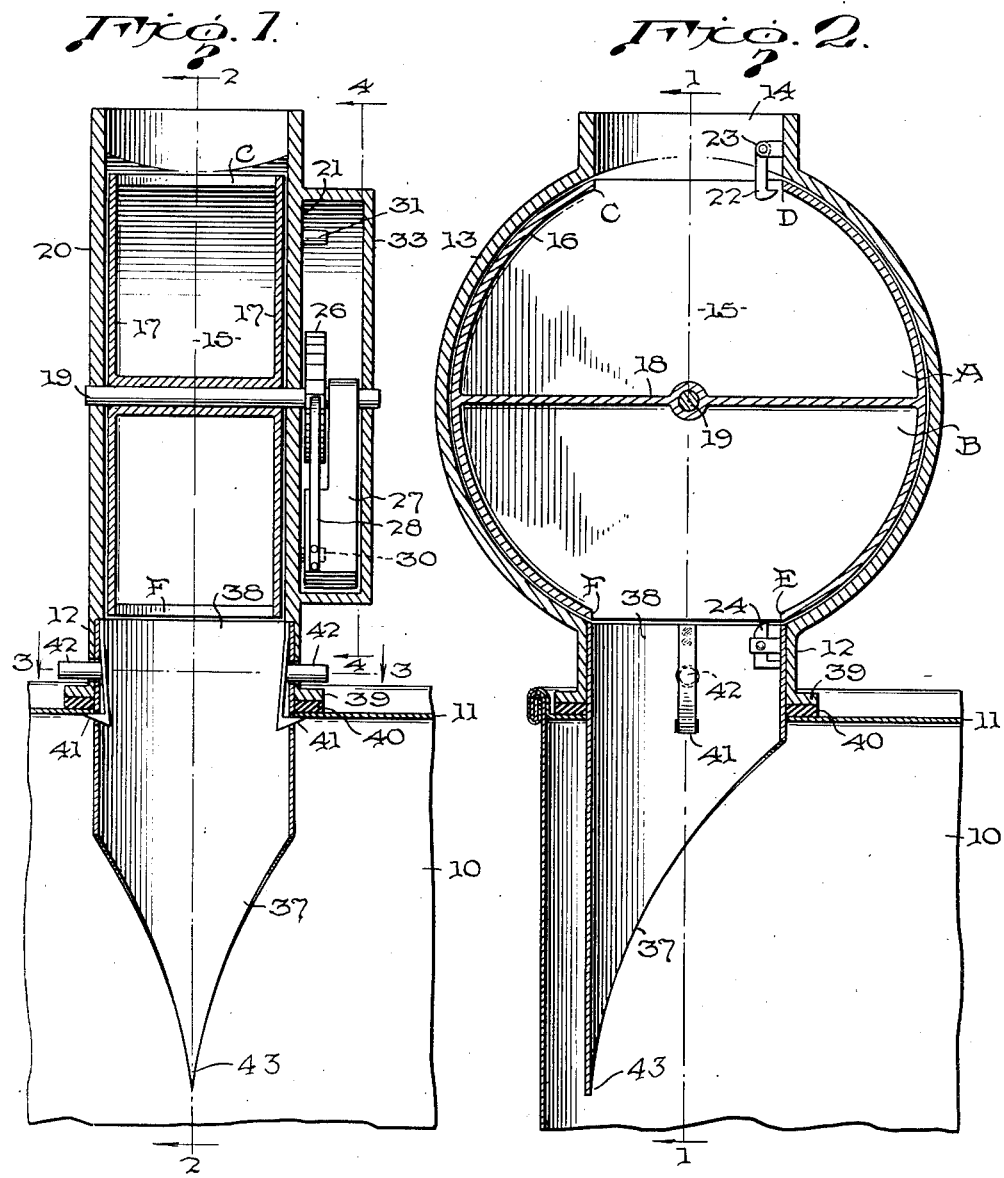
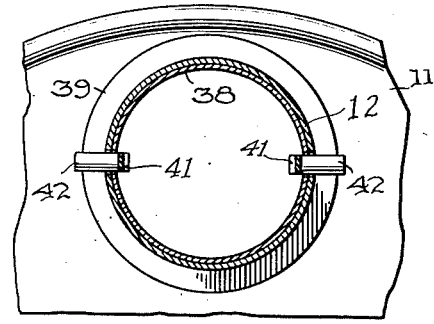
INVENTOR.
IRA S. BOYDSTUN
BY
ATTORNEY Sept. 1, 1953  I. S. BOYDSTUN  2,650,739
VOLUMETRIC MEASURING AND DISPENSING DEVICE
WITH CONTAINER CUTTING AND ATTACHING MEANS
Filed Oct. 30, 1950  2 Sheets-Sheet 2
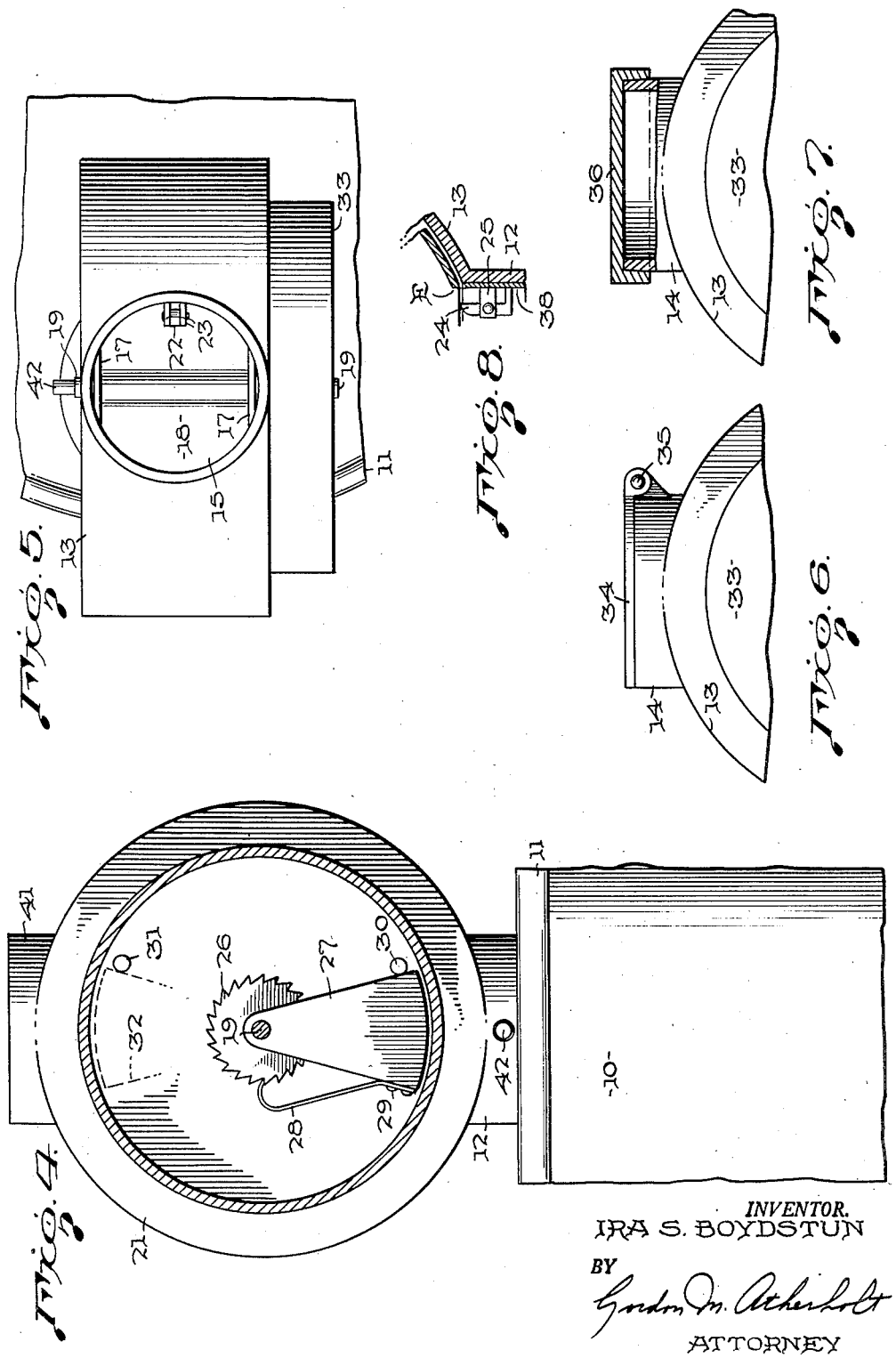
INVENTOR.
IRA S. BOYDSTUN
BY
ATTORNEY Patented Sept. 1, 1953

2,650,739

UNITED STATES PATENT OFFICE 2,650,739

VOLUMETRIC MEASURING AND DISPENSING DEVICE WITH CONTAINER CUTTING AND ATTACHING MEANS

Ira S. Boydstun, Houston, Tex.

Application October 30, 1950, Serial No. 192,999

3 Claims. (Cl. 222—82)

This invention relates to a device for dispensing particulate material, and more particularly it relates to a device to be mounted on top of a container and which will dispense a measured quantity from the container each time it is inverted.

One object of this invention is to provide a dispensing device that will repeatedly deliver measured quantities of discrete particles of solid material without the customary manual measuring with separate measuring devices.

Another object of this invention is to provide a device of the character previously mentioned that will handle solid material in particle size ranging from the finest powder up to the size of a coffee bean.

Another object of this invention is to provide a dispensing device of the character described that is readily attachable to standard commercial containers of tin, cardboard, etc., and which can readily be removed from an emptied container and be attached to another container.

This dispensing device can readily be provided to fit all ordinary sizes of retail containers and is particularly convenient and advantageous for dispensing measured quantities of coffee, regardless of whether the coffee be powdered, finely ground, coarsely ground, or in the whole bean. Likewise the device is especially advantageous for dispensing measured quantities of sugar, salt, meal, flour, baking powder, dry powdered or granulated drugs, etc.

This dispensing device is designed to deliver identical volumes each time the container to which it is attached is inverted, but the devices can be made in different sizes to deliver any predetermined volume. For instance the device can be constructed to invariably deliver a teaspoonful, or to invariably deliver a cupful. A tablespoonful size would be particularly convenient for coffee, the teaspoonful for sugar, and the cupful for flour. Any other described size could be as easily constructed and as satisfactorily used.

For uses where it is desired to keep the contents of the container away from open air the discharge spout of this device can be fitted with a hinged cover or a friction cap or a screw cap.

This device is an improvement over fixed-volume dispensing devices heretofore available in that this device delivers the measured volume simply by inverting the container to which it is attached. It does not require the use of two hands to operate it, or the pushing or pulling or twisting of some element.

The device can best be described with reference to the attached drawings, in which:

Figure 1 is a vertical section taken along line 1—1 of Figure 2;

Figure 2 is a section taken on line 2—2 of Figure 1;

Figure 3 is a transverse view taken on line 3—3 of Figure 1;

Figure 4 is a vertical section and elevation taken on line 4—4 of Figure 1;

Figure 5 is a top view of the device, attached to a container;

Figure 6 is a detail of the discharge spout of the device, showing the use of a hinged cover to exclude air;

Figure 7 is a detail of the discharge spout of the device showing the use of a friction cap to exclude air; and Figure 8 is a detail of a latch arrangement shown in Figure 2 for preventing backward movement of the rotor.

Referring to Figures 1 and 2, reference numeral 10 indicates a container to which the dispensing device is attached, in this case a conventional tin can such as is commonly used for coffee. The dispensing device is fitted at the base with a metallic tubular element 38 adapted to puncture the top of tin container 10 and for cutting a hole therein, and which carries retractable latches 41 for fastening the entire device to the punctured can. The metallic tube 38 used as a base of the device, as shown in the drawings, is a cylindrical tube, although, of course, it may be of other cross section such as square, oblong, diamond-shaped, etc. The metal tubular element 38 is fastened into the neck 12 of an upper structure 13, advantageously made of plastic. In such case the tubular element is fastened to the plastic element 13 by having slight bosses in that portion of element 38 that will be adjacent to plastic element 13 and the plastic is then molded to the metallic element in a manner customary in the plastic molding art. The lower end of the metallic tubular element 38 is cut off at an acute angle to produce a point 43 at the extreme end and cutting edges 37 thereabove. The upper end of the angular cut of the tubular element is positioned so that it will come slightly inside the top of container 10 when installed as herein described. The edges 37 of the angular cut on the tubular element 38 serve as the cutting means for making a circular hole in the top of the container 10 and the tubular element is made of a metal adapted to that purpose. The housing 13 of my invention terminates at its lower end in elements 12 and 39. Element 12 serves both as a collar to permit a fastening to metallic element 38 and as a throat for the feeding from the can into the measuring compartments A and B of material to be measured. Element 39 is an enlarged annular ring at the base of housing 13, provided to seat the device on the punctured top 11 of container 10. A washer of neoprene or other compressible material 40 is provided to permit a firm and substantially air tight connection. Two retractable latches 41 are positioned in opposite sides of the upper neck of tubular element 38 and are so positioned that when base ring 39 and compressible washer 40 of the device are pressed down tight against can top 11, the latches will just pass through the punctured can top 11 and spring outwardly and thereby fasten the device to the can with which it is to be used. The latches 41 are provided with buttons 42 which can be compressed by the fingers and thereby disengage latches 41 from the under surface of can top 11, and thereby permit removal of the device from an empty can. The body of the dispensing device comprises mainly a short horizontal cylindric housing with side walls 13 (see Fig. 2) and end walls 20 and 21 (see Fig. 1). It communicates at its base with the container 10 through cylindric throat 12 and tubular element 38, and is fitted at the top with cylindric spout 14.

The throat of metallic element 38 is shown to be the full width of the rotor housing, but when fine particles are to be dispensed it is advantageous to make this throat slightly narrower than the distance between the end walls 17 of the rotor. This reduces the tendency of particles to work into the narrow space between rotor walls 17 and housing walls 20 and 21.

The rotor as a whole is identified by reference numeral 15. This rotor fits snugly but freely inside of the housing 13 and comprises rotor side walls 16, rotor end walls 17 (see Fig. 1), and a bisecting diaphragm 18. The bisecting diaphragm 18 divides the rotor into two identical measuring chambers A and B. The rotor is mounted concentrically with the housing side walls 13 on shaft 19. It will be noted that the side walls 16 of the rotor do not extend unbroken through the entire 360°. Openings C—D and E—F, comparable in size to the throat of metallic element 38 and spout 14 serve as the channels for filling and emptying the two measuring chambers A and B formed in the rotor by diaphragm 18. Latch 22, pivoted on bracket 23 serves a purpose which will be subsequently described in connection with the operation of the dispensing device. So also latch 24, pivoted on bracket 25.

The remainder of Figures 1 and 2 can best be described in conjunction with Figure 4. Referring to Figure 4, shaft 19 extends the entire length axially of the dispensing device and has fastened to it in fixed relation not only rotor 15 but also ratchet wheel 26. The ratchet wheel teeth are cut in the manner indicated in Figure 4. Shaft 19 also carries weight 27, but this weight is not fastened to the shaft and it revolves freely about it. Weight 27 carries a spring pawl 28 fastened to the weight at 29. Stops 30 and 31 protrude from housing 21 and limit the movement of weight 27. The weight is shown at one limit of its course, against stop 30, and the opposite extreme of its motion, resting against stop 31, is indicated by dashed outline 32. The ratchet 26 and weight 27 are enclosed by housing 33. Housing walls 20, 21 and 33 are pierced to receive and support shaft 19.

Wall 21 is not essential between rotor wall 17 and ratchet wheel 26, but is advantageous in keeping particles of matter from container 10 from getting in around the ratchet and weight.

Figure 3 is a transverse view taken on line 3—3 of Figure 1, and serves to show the cylindrical shape of the collar 12 and the tubular element 38, as well as to show the positions of buttons 42 and latches 41.

Figure 5 is a top view of the dispensing device and all reference numerals appearing thereon have been identified in connection with Figures 1, 2, 3 and 4.

Figure 6 is a detail of the discharge spout 14 fitted with a cover 34 hinged at 35, the hinge being put on the same side of spout 14 as the latch 22 so as to permit convenient pouring.

Figure 7 is a detail of the discharge spout 14 fitted with a friction cap 36 to exclude air. The outside of spout 14 and inside of cap 36 can advantageously be turned with a slight taper to give a tight fit. Also the cap may be of thin metal, lightly sweated on to permit easy removal, and thus permit packing the container and dispenser under vacuum.

Figure 8 is an enlarged view of latch 24 in throat 12 at the base of the dispensing device. Latch 24 is carried from the wall of throat 12 by bracket 25. The latch is designed to resist clockwise motion of rotor edge E and to permit of its being pushed down out of the way by counter-clockwise motion of rotor edge F or edge D.

The operation of the dispensing device is as follows. The entire device is placed against the top of the container 10 with which it is intended to use the device, and a straight downward pressure is applied to the device sufficient to force the sharp point 43 through the top of container 10 and to permit the sharp cutting edges 37 of tubular cutter element 38 to cut the necessary round hole in the top of container 10. By finally forcing the device all the way home against the top of the container, the retractable latches or fastening devices 41 are forced back inside the periphery of the tubular cutting element 38 and when the device is driven completely home these latches will again spring out beyond the periphery of tubular element 38 and hold the entire device tight to container 10. In this position the washer 40, made of neoprene or some other compressible material, will be slightly compressed and will make an air tight connection. If not already in that position the rotor 15 is brought into the position shown in Figure 1 with its openings C—D and E—F in register with the spout 14 and throat 12. This can be done by moving the rotor with the finger or by tilting the device to the necessary degree. For the purpose of this description it will be assumed that opening C—D of measuring chamber A is in register with pouring spout 14 and that container 10 is in an upright position and is filled with suitable material. To actuate this device it is necessary that the dispenser be inverted in a direction that would be contraclockwise in respect to Figure 4, and whenever a motion is spoken of in this description as clockwise or contra-clockwise it means such direction with respect to Figure 4.

When the container and empty dispensing device are inverted by a contra-clockwise motion, material from container 10 will pour through tubular element 38 and opening E—F and fill measuring chamber B. When the device is so inverted, the weight 27 rotates freely around shaft 19 and falls to the position indicated in Figure 4 by reference numeral 32, its motion being limited by stop 31. When the weight moves in this clockwise direction from stop 30 to stop 31 the pawl 28 rides lightly over the teeth of ratchet 26 without turning the ratchet wheel and the shaft 19 which is fixed to the rotor 15.

Gravity will always keep weight 27 hanging below shaft 19 and when the inverted dispenser is returned to an upright position through a clockwise motion the pawl 28 attached to weight 27 will engage the teeth of ratchet wheel 26 and maintain the ratchet wheel and the rotor in an unchanged position with respect to the earth. This is assured by making weight 27 several times as heavy as the contents of a filled measuring compartment. Measuring chamber B was higher than measuring chamber A when the dispensing device was inverted and it retains that higher position when the dispensing device is restored to an upright position. After this first filling of one measuring chamber the device functions uniformly until container 10 is empty. Subsequent functioning is as follows. The device is now standing upright with measuring chamber B in the upper position, filled with material from container 10 in the last previous operation. When the container 10 and the dispenser are now inverted by a counterclockwise motion the rotor retains a fixed position with respect to its housing and measuring chamber B pours its contents out through spout 14. Simultaneously measuring chamber A is being filled by material flowing downward into it through tubular element 38 from container 10. From this point on, the operation is precisely as described for the initial operation.

It will be noted that the movement of the dispensing device housing is always contra-clockwise to pour and clockwise in returning to an upright position, that the movement of the rotor is always contra-clockwise, that the rotor remains in fixed relation to its housing during the contra-clockwise motion to pour and remains in fixed relation to the earth during the clockwise motion of the container to an upright position. The weight 27 operating through pawl 28 on ratchet wheel 26 prevents clockwise rotation of the rotor 15. This is so because, as previously pointed out, the ratchet wheel 26 and the rotor 15 are both fastened in fixed relation to shaft 19 while weight 27 is not fastened to the shaft and is free to rotate independently within the limits of stops 30 and 31.

Rotor 15 does not move in fixed relation to its housing during the return from pouring position because of the restraining influence of weight 27, but it does not ordinarily fail to maintain fixed position with its housing when being inverted to pour. This results from the small amount of friction naturally present in the system and from the fact that the weight of the material in the measuring chamber is all above the shaft 19 and that tends to cause rotation in the one possible direction when equilibrium is disturbed.

A device of this character, to win public approval when put into wide use, must operate satisfactorily in all hands and even when abused and it is therefore fitted with latches 22 and 24. If pouring is done with a jerky and swift motion it is sometimes possible to impart enough momentum to the rotor with its unbalanced charge of material so that it will overrun its housing in the counter-clockwise motion and tend to carry the openings C—D and E—F beyond the spout 14 and the opening of tubular element 38. To prevent this possibility I provide a latch 22 which prevents the edges D and F from advancing ahead of the housing in the first portion of the pouring motion. Such restraint is needed only in the first portion of the pouring motion and the latch is designed to fall away from the path of the rotor in the final portions of the pouring motion. The latch hangs well away from the path of rotor edges D and F when the spout 14 passes back over them in starting to return to an upright position.

When weight 27 is moving from position against stop 30 to position against stop 31 the pawl 28 runs freely over the inclined sides of the ratchet teeth. If the pawl is made of sufficiently light and sensitive spring material it will not exert enough drag on the teeth to cause any rotation of the rotor in a clockwise direction but that possibility can always be provided against by a latch 24 positioned in the throat of cylindrical element 38. This latch is shown enlarged in Figure 8. It is carried on a bracket 25 and that portion of it below its pivot is made to weigh more than the upper portion so that it will stand upright in the early stages of the pouring motion and thus stand in position to prevent clockwise motion of the rotor. In those cases where this latch is called on to serve its function the rotor edge E or edge C will be bearing against it from an early stage of the pouring motion and thus hold it in operative position. If the rotor is not bearing against latch 24 the heavier weight in its lower portion will pull it out of the path of the rotor when the dispensing device is in a partially inverted position. Even when standing upright latch 24 cannot interfere with counter-clockwise rotation of the rotor because it is designed as shown to yield and move down out of the path of the rotor when the rotor is moving in its intended counter-clockwise direction.

In the appended claims, when I speak of successive reciprocative inversion I mean thereby a succession of cycles in which the dispensing device is in each cycle moved from an upright position to an inverted position and back to an upright position, the successive motions being a part revolution in one direction followed by a similar part revolution in the opposite direction.

The successive inversions are described as reciprocative to distinguish from the successive inversions that would be performed by a continuing rotation of the device in a single direction. My device would not function if the motion from upright to inverted to upright were performed by a complete revolution in one direction: its functioning is dependent on a reciprocating motion in which the device is inverted from upright by a motion in one direction, followed by a motion in the opposite direction back to upright.

This invention is particularly adaptable to containers made of thin sheet metal such as tin plate, and of equivalent materials such as stiff cardboard, etc., and when I speak in this specification and the appended claims of containers made of relatively thin walled material and of relatively inflexible material I mean thereby tin and terne plate in the weights ordinarily used in the manufacture of coffee containers and other retail-size food containers, and I mean to include containers of stiff cardboard and like materials such as are used in packaging sugar, salt, etc. The terms are not intended to comprehend material so heavy that it could not well be punctured and cut by hand operation, or material so lacking in rigidity that the entire surface could not be held tight against the shoulder 39 or washer 40 by one or two latches such as the indicated latch 41.

What I claim is:

1. A device for use in conjunction with a container for dispensing therefrom fixed volumes of dry material in the form of discrete particles, which comprises a hollow cylindric rotor divided on an axial plane into two equal measuring chambers, each chamber having an opening for filling and emptying, the two such openings being diametrically opposite; a housing fitted snugly around the rotor while yet free enough to permit easy movement of rotor in relation to housing; openings in diametrically opposite sides of the housing coinciding with the openings in the rotor, one such opening serving as a discharge spout and the other such opening serving as a filling throat; a shaft mounted axially of the cylindric rotor and fastened thereto and journaled in the ends of the rotor housing to maintain the rotor concentric therein; a ratchet wheel mounted on said shaft and fastened thereto; a weight hanging loosely pendent from the said shaft adjacent to the ratchet wheel and carrying a pawl engaging the teeth of said ratchet wheel; a stop located on the housing immediately alongside the position taken by the weight when the dispensing device is in an upright position, and on that side of the weight that will prevent motion of the weight in the direction that would cause the pawl to engage the teeth of the ratchet wheel; a second stop located on the housing to permit the weight to move 180° around the shaft from its position against the first-mentioned stop, and to prevent its moving substantially more than 180°; a tubular metallic element extending from the filling throat of the rotor housing, having its remote end cut off at an angle to the longitudinal axis thereof, to form a sharp point at the extremity thereof and cutting edges along the remainder of the cut; a shoulder at the filling-throat end of the rotor housing, adapted to permit seating of the said housing on the flat top of a container; a retractable latch adjacent the said shoulder, to engage the inner face of a container top when the said shoulder is seated on the outer face of said container top, whereby the rotor housing is made fast to the container and upon retraction of said latch is made removable therefrom.

2. A device for use in conjunction with a container for dispensing therefrom fixed volumes of dry material in the form of discrete particles, which comprises a hollow cylindric rotor divided on an axial plane into two equal measuring chambers, each chamber having an opening for filling and emptying, the two such openings being diametrically opposite; a housing fitted snugly around the rotor while yet free enough to permit easy movement of rotor in relation to housing, openings in diametrically opposite sides of the housing coinciding with the openings in the rotor, one such opening serving as a discharge spout and the other such opening serving as a filling throat; a shaft mounted axially of the cylindric rotor and fastened thereto and journaled in the ends of the rotor housing to maintain the rotor concentric therein; a ratchet wheel mounted on said shaft and fastened thereto; a weight hanging loosely pendent from the said shaft adjacent to the ratchet wheel and carrying a pawl engaging the teeth of said ratchet wheel; a stop located on the housing immediately alongside the position taken by the weight when the dispensing device is in an upright position, and on that side of the weight that will prevent motion of the weight in the direction that would cause the pawl to engage the teeth of the ratchet wheel; a second stop located on the housing to permit the weight to move 180° around the shaft from its position against the first-mentioned stop, and to prevent its moving substantially more than 180°; a latch positioned on the housing adjacent the rotor which, when the dispensing device is in an upright position, falls into position to stop the rotating rotor with its opening in alignment with the aforementioned discharge spout and which falls out of the path of the rotor when the dispensing device is in an inverted position; and a second latch to prevent reverse rotation of the rotor; a tubular metallic element extending from the filling throat of the rotor housing, having its remote end cut off at an angle to the longitudinal axis thereof, to form a sharp point at the extremity thereof and cutting edges along the remainder of the cut; a shoulder at the filling-throat end of the rotor housing, adapted to permit seating of the said housing on the flat top of a container; a retractable latch adjacent the said shoulder, to engage the inner face of a container top when the said shoulder is seated on the outer face of said container top, whereby the rotor housing is made fast to the container and upon retraction of said latch is made removable therefrom.

3. A device for use in conjunction with a container for dispensing therefrom fixed volumes of dry material in the form of discrete particles, which comprises a hollow cylindric rotor divided on an axial plane into two equal measuring chambers, each chamber having an opening for filling and emptying, the two such openings being diametrically opposite; a housing fitted snugly around the rotor while yet free enough to permit easy movement of rotor in relation to housing, openings in diametrically opposite sides of the housing coinciding with the openings in the rotor, one such opening serving as a discharge spout and the other such opening serving as a filling throat; a shaft mounted axially of the cylindric rotor and fastened thereto and journaled in the ends of the rotor housing to maintain the rotor concentric therein; a ratchet wheel mounted on said shaft and fastened thereto; a weight hanging loosely pendent from the said shaft adjacent to the ratchet wheel and carrying a pawl engaging the teeth of said ratchet wheel; a stop located on the housing immediately alongside the position taken by the weight when the dispensing device is in an upright position, and on that side of the weight that will prevent motion of the weight in the direction that would cause the pawl to engage the teeth of the ratchet wheel; a second stop located on the housing to permit the weight to move 180° around the shaft from its position against the first-mentioned stop, and to prevent its moving substantially more than 180°; a pendent latch positioned on the pouring spout of the housing, hanging down when the dispensing device is in upright position, to stop the rotating rotor with its opening in alignment with the aforementioned discharge spout, and hanging out of the path of the rotor when the dispensing device is in an inverted position; and a second latch positioned in the filling throat to prevent reverse rotation of the rotor; a tubular metallic element extending from the filling throat of the rotor housing, having its remote end cut off at an angle to the longitudinal axis thereof, to form a sharp point at the extremity thereof and cutting edges along the remainder of the cut; a shoulder at the filling-throat end of the rotor housing, adapted to permit seating of the said housing on the flat top of a container; a retractable latch adjacent the said shoulder, to engage the inner face of a container top when the said shoulder is seated on the outer face of said container top, whereby the rotor housing is made fast to the container and upon retraction of said latch is made removable therefrom.

IRA S. BOYDSTUN.

References Cited in the file of this patent

UNITED STATES PATENTS

| Number | Name | Date |
|---|---|---|
| 940,128 | Childs | Nov. 16, 1909 |
| 1,370,739 | Gay | Mar. 8, 1921 |
| 1,577,235 | Hucks | Mar. 16 1926 |
| 1,688,080 | Hoseth | Oct. 16, 1928 |
| 2,150,082 | Springer | Mar. 7, 1939 |

FOREIGN PATENTS

| Number | Country | Date |
|---|---|---|
| 641,696 | Germany | Oct. 4, 1935 |